(12) United States Patent
Depraete

(10) Patent No.: US 9,739,358 B2
(45) Date of Patent: Aug. 22, 2017

(54) HYDROKINETIC TORQUE COUPLING DEVICE HAVING DAMPER-PISTON LOCKUP CLUTCH, AND RELATED METHOD

(71) Applicant: VALEO EMBRAYAGES, Amiens (FR)

(72) Inventor: Alexandre Depraete, Bloomfield, MI (US)

(73) Assignee: Valeo Embrayages (FR)

( * ) Notice: Subject to any disclaimer, the term of this patent is extended or adjusted under 35 U.S.C. 154(b) by 0 days.

(21) Appl. No.: 14/687,602

(22) Filed: Apr. 15, 2015

(65) Prior Publication Data

US 2016/0305525 A1 Oct. 20, 2016

(51) Int. Cl.
*F16H 45/02* (2006.01)

(52) U.S. Cl.
CPC ..... *F16H 45/02* (2013.01); *F16H 2045/0221* (2013.01); *F16H 2045/0278* (2013.01)

(58) Field of Classification Search
CPC ............. F16H 45/02; F16H 2045/0205; F16H 2045/0221; F16H 2045/0226; F16H 2045/0231; F16H 2045/0263; F16H 2045/0273; F16H 2045/023; F16H 2045/278

See application file for complete search history.

(56) References Cited

U.S. PATENT DOCUMENTS

| | | |
|---|---|---|
| 2,130,895 A | 9/1938 | Ness |
| 2,860,747 A | 11/1958 | Kelley |
| 2,992,713 A | 7/1961 | Stump et al. |
| 3,041,892 A | 7/1962 | Schjolin |
| 3,252,352 A | 5/1966 | General et al. |

(Continued)

FOREIGN PATENT DOCUMENTS

| | | |
|---|---|---|
| DE | 1550957 A1 | 7/1969 |
| DE | 2245901 A1 | 4/1974 |

(Continued)

OTHER PUBLICATIONS

U.S. Appl. No. 14/510,244, filed Oct. 9, 2014, First Named Inventor: Alexandre Depraete.

(Continued)

*Primary Examiner* — Richard Lorence
*Assistant Examiner* — Lori Wu
(74) *Attorney, Agent, or Firm* — Berenato & White, LLC

(57) ABSTRACT

A hydrokinetic torque coupling device includes a casing shell having a first engagement surface, a torque converter including an impeller and a turbine that is hydrodynamically drivable by the impeller and includes a turbine shell, an output hub, a damper-piston assembly including torsional vibration damping members and a piston retainer plate having a second engagement surface facing the first engagement surface, and a transmission component through which the torsional vibration damping members are interconnected to the output hub. The piston retainer plate engages the first ends of the damping members and the transmission component engages the second ends of the torsional vibration damping members. The damper-piston assembly is axially displaceable between a lockup mode and a hydrodynamic transmission mode.

20 Claims, 9 Drawing Sheets

(56) References Cited

U.S. PATENT DOCUMENTS

| | | | |
|---|---|---|---|
| 4,041,701 A | 8/1977 | Goto et al. | |
| 5,713,442 A | 2/1998 | Murata et al. | |
| 5,743,365 A * | 4/1998 | Makino | F16H 45/02 192/212 |
| 5,813,505 A | 9/1998 | Olsen et al. | |
| 6,026,940 A | 2/2000 | Sudau | |
| 6,915,886 B2 | 7/2005 | Dacho et al. | |
| 7,191,879 B2 | 3/2007 | Arhab et al. | |
| 7,445,099 B2 | 11/2008 | Maucher et al. | |
| 8,276,723 B2 * | 10/2012 | Verhoog | F16H 45/02 192/3.29 |
| 8,479,901 B2 | 7/2013 | Engelmann | |
| 2003/0168298 A1 | 9/2003 | Holler et al. | |
| 2003/0168299 A1 | 9/2003 | Holler et al. | |
| 2004/0011032 A1 | 1/2004 | Holler et al. | |
| 2004/0139743 A1 * | 7/2004 | Sato | F16D 41/066 60/345 |
| 2006/0086584 A1 | 4/2006 | Maucher et al. | |
| 2007/0256905 A1 * | 11/2007 | Brees | F16D 1/0876 192/3.29 |
| 2009/0020385 A1 | 1/2009 | Nakamura | |
| 2010/0236228 A1 * | 9/2010 | Degler | F16F 15/145 60/338 |
| 2011/0132709 A1 * | 6/2011 | Fukunaga | F16H 41/24 192/3.23 |
| 2012/0241273 A1 | 9/2012 | Kawahara | |
| 2013/0230385 A1 * | 9/2013 | Lindemann | F16D 33/18 415/122.1 |
| 2014/0014454 A1 | 1/2014 | Davis | |
| 2014/0014455 A1 | 1/2014 | Davis | |
| 2014/0097055 A1 | 4/2014 | Lindemann et al. | |
| 2014/0110207 A1 | 4/2014 | Davis | |
| 2014/0209423 A1 * | 7/2014 | Kawahara | F16F 15/134 192/3.28 |
| 2014/0339042 A1 * | 11/2014 | Togawa | F16H 45/02 192/3.29 |
| 2015/0152950 A1 * | 6/2015 | Schrader | F16H 45/02 192/3.28 |
| 2015/0362041 A1 | 12/2015 | Lee et al. | |
| 2016/0053878 A1 * | 2/2016 | Amano | F16H 45/02 60/338 |
| 2016/0186848 A1 * | 6/2016 | Hagihara | F16F 15/145 192/66.3 |

FOREIGN PATENT DOCUMENTS

| | | |
|---|---|---|
| DE | 10226860 A1 | 12/2003 |
| EP | 0125428 A1 | 11/1984 |
| EP | 1744074 | 1/2007 |
| FR | 668839 A | 11/1929 |
| FR | 2317556 A1 | 2/1977 |
| FR | 2428188 A1 | 1/1980 |
| FR | 2561342 A1 | 9/1985 |
| FR | 2706967 A1 | 12/1994 |
| FR | 2736982 A1 | 1/1997 |
| FR | 2787854 A1 | 6/2000 |
| GB | 598811 | 2/1948 |
| JP | 58-131466 A | 8/1983 |
| KR | 101311531 B1 | 9/2013 |
| WO | WO2004018897 | 3/2004 |
| WO | 2004046574 A1 | 6/2004 |

OTHER PUBLICATIONS

U.S. Appl. No. 14/510,267, filed Oct. 9, 2014, First Named Inventor: Alexandre Depraete.
U.S. Appl. No. 14/522,189, filed Oct. 23, 2014, First Named Inventor: Alexandre Depraete.
U.S. Appl. No. 14/522,263, filed Oct. 23, 2014, First Named Inventor: Alexandre Depraete.
U.S. Appl. No. 14/522,302, filed Oct. 23, 2014, First Named Inventor: Alexandre Depraete.
U.S. Appl. No. 14/522,333, filed Oct. 23, 2014, First Named Inventor: Alexandre Depraete.
U.S. Appl. No. 14/522,361, filed Oct. 23, 2014, First Named Inventor: David Werthman.
U.S. Appl. No. 14/522,372, filed Oct. 23, 2014, First Named Inventor: Alexandre Depraete.
U.S. Appl. No. 14/522,393, filed Oct. 23, 2014, First Named Inventor: Alexandre Depraete.
U.S. Appl. No. 14/561,961, filed Dec. 5, 2014, First Named Inventor: Alexandre Depraete.
U.S. Appl. No. 14/562,022, filed Dec. 5, 2014, First Named Inventor: Alexandre Depraete.
U.S. Appl. No. 14/562,064, filed Dec. 5, 2014, First Named Inventor: Alexandre Depraete.
U.S. Appl. No. 14/562,099, filed Dec. 5, 2014, First Named Inventor: Alexandre Depraete.
U.S. Appl. No. 14/562,136, filed Dec. 5, 2014, First Named Inventor: Alexandre Depraete.
U.S. Appl. No. 14/562,216, filed Dec. 5, 2014, First Named Inventor: Sungchul Lee.
U.S. Appl. No. 14/562,253, filed Dec. 5, 2014, First Named Inventor: Alexandre Depraete.
U.S. Appl. No. 14/562,286, filed Dec. 5, 2014, First Named Inventor: Alexandre Depraete.
Lindemann et al., "iTC—Innovative Solutions for Torque Converters Pave the Way into the Future", Torque Converter 20, pp. 280-301.
Machine Translation of EP 0125428 downloaded from EPO.org on Jul. 22, 2016.

* cited by examiner

HYDROKINETIC TORQUE COUPLING DEVICE HAVING DAMPER-PISTON LOCKUP CLUTCH, AND RELATED METHOD

BACKGROUND OF THE INVENTION

1. Field of the Invention

The present invention generally relates to hydrokinetic torque coupling devices, and more particularly to a hydrokinetic torque coupling device including a damper-piston lockup clutch for mechanically coupling driving and driven shafts.

2. Description of the Related Art

Generally, vehicles with automatic transmissions are equipped with a hydrokinetic torque coupling device for fluidly coupling the driving shaft of an engine to a driven shaft of a transmission. Lockup clutches are known for mechanically coupling the driving and driven shafts under certain operating conditions. Lockup clutches and their operation are described in, for example, U.S. Pat. Nos. 8,276,723 and 7,191,879.

While hydrokinetic torque coupling devices with lockup clutches have proven to be useful for vehicular driveline applications and conditions, improvements that may enhance their performance and cost are possible.

As taught hereinbelow, such improvements may derive from, for example, reducing the spatial requirements of components of the hydrokinetic torque coupling device and/or consolidating functions of two or more components into a single component.

BRIEF SUMMARY OF THE INVENTION

According to a first aspect of the invention, a hydrokinetic torque coupling device is provided for coupling together a driving shaft and a driven shaft. The hydrokinetic torque coupling device of this first aspect includes a casing shell rotatable about a rotational axis and having a first engagement surface, a torque converter rotatable about the rotational axis and including an impeller and a turbine that is hydrodynamically drivable by the impeller and includes a turbine shell, an output hub, a damper-piston assembly including torsional vibration damping members and a piston retainer plate having a second engagement surface facing the first engagement surface, and a transmission component through which the torsional vibration damping members are interconnected to the output hub. The torsional, vibration damping members are circumferentially spaced from one another and have opposite first and second ends, with the piston retainer plate comprising a shell portion retaining the torsional vibration damping members, first angular driving tabs engaging radially inner halves of the first ends of the torsional vibration damping members, and second angular driving tabs engaging radially outer halves of the first ends of the torsional vibration damping members. The transmission component engages the second ends of the torsional vibration damping members. The damper-piston assembly is axially displaceable relative to the casing shell between a lockup mode in which the first and second engagement surfaces are frictionally engaged with one another so that the piston retainer plate and the casing shell are non-rotatable relative to one another, and a hydrodynamic transmission mode in which the first and second engagement surface are spaced from and rotatable relative to one another. Preferably, the first and second angular driving tabs each comprise elbows having opposite ends merging with the shell portion of the piston retainer plate.

A second aspect of the invention provides a hydrokinetic torque coupling device for coupling together a driving shaft and a driven shaft. The hydrokinetic torque coupling device of this second aspect includes a casing shell rotatable about a rotational axis and having a first engagement surface, a torque converter rotatable about the rotational axis and including an impeller and a turbine that is hydrodynamically drivable by the impeller and includes a turbine shell, an output hub that is non-rotatable relative to the turbine shell, a damper-piston assembly including torsional vibration damping members and a piston retainer plate having a second engagement surface facing the first engagement surface, and a transmission component through which the torsional vibration damping members are interconnected to the output hub. The torsional vibration damping members are circumferentially spaced from one another and have opposite first and second ends. The piston retainer plate comprising a shell portion retaining the torsional vibration damping members, first angular driving tabs engaging radially inner halves of the first ends of the torsional vibration damping members, and second angular driving tabs engaging radially outer halves of the first ends of the torsional vibration damping members. The transmission component has a first end portion non-rotatable connected to the turbine shell and a second end portion engaging the second ends of the torsional vibration damping members. The damper-piston assembly is axially displaceable relative to the casing shell between a lockup mode in which the first and second engagement surfaces are frictionally engaged with one another so that the piston retainer plate and the casing shell are non-rotatable relative to one another, and a hydrodynamic transmission mode in which the first and second engagement surfaces are spaced from and rotatable relative to one another. Preferably, the first and second angular driving tabs each comprise elbows having opposite ends merging with the shell portion of the piston retainer plate.

A third aspect of the invention provides a hydrokinetic torque coupling device for coupling together a driving shaft and a driven shaft. The hydrokinetic torque coupling device of this third aspect includes a casing shell rotatable about a rotational axis and having a first engagement suffice, a torque converter rotatable about the rotational axis and including an impeller and a turbine that is hydrodynamically drivable by the impeller and includes a turbine shell, an output hub, and a damper-piston assembly. The damper-piston assembly includes a first set of first torsional vibration members circumferentially spaced from one another, a second set of second torsional vibration members circumferentially spaced from one another, an output member, and a transmission component through which the first torsional vibration damping members are interconnected to the output hub. The piston retainer plate has a second engagement surface facing the first engagement surface. The piston retainer plate comprises a shell portion retaining the first vibration damping members, first angular driving tabs engaging radially inner first ends of the first torsional vibration damping members, and second angular driving tabs engaging radially outer halves of the first ends of the torsional vibration damping members. The transmission component has a first end portion engaging second ends of the first torsional vibration damping member and a second end portion engaging third ends of the second torsional vibration damping members. The output member interconnects fourth ends of the second torsional vibration members to the output hub. The damper-piston assembly is axially displaceable relative to the casing shell between a lockup mode in which the first and second engagement surfaces are frictionally engaged with one another so that the piston retainer plate and the casing shell are non-rotatable relative to one another, and a hydrodynamic transmission mode in which the first and second engagement surfaces are spaced from and rotatable relative to one another. Preferably, the first and second angular driving tabs each comprise elbows having opposite ends merging with the shell portion of the piston retainer plate.

Other aspects of the invention, including apparatus, devices, systems, coupling devices, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein.

Figure 1:
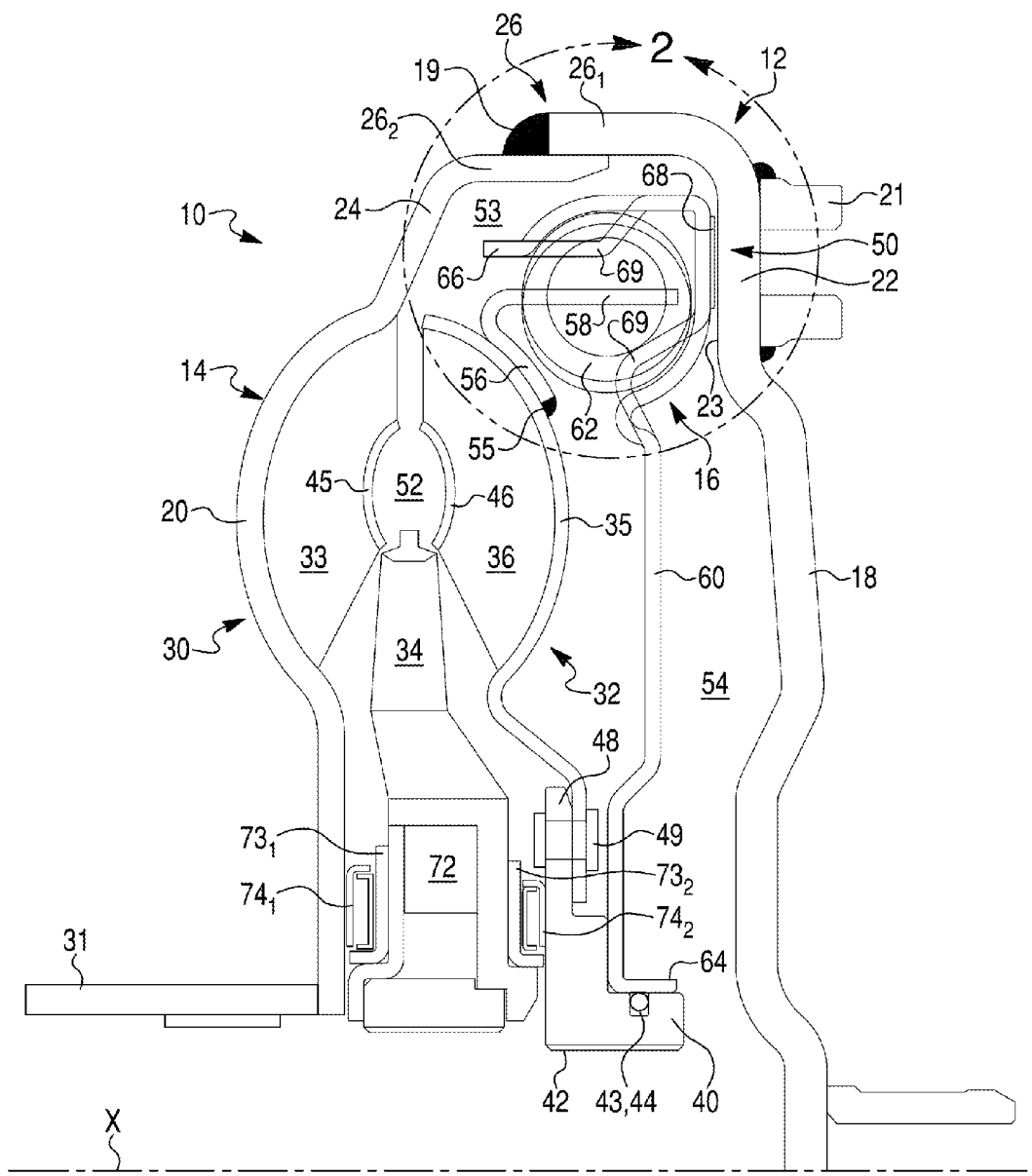
FIG. 1 is a fragmented half-view in axial cross section of a hydrokinetic torque coupling device including a damper-piston assembly with a piston retainer plate in accordance with a first exemplary embodiment of the present invention.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper," "lower," "right," "left," "top," and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the words "a" and "an" as used in the claims means "at least one."

A first exemplary embodiment of a hydrokinetic torque coupling device is generally represented in the accompanying drawings by reference numeral 10, as best shown in the fragmentary sectional view in FIG. 1. The hydrokinetic torque coupling device 10 is selectively operable to fluidly or mechanically couple a driving shaft and a driven shaft of a motor vehicle, such as an automobile. In the typical case, the driving shaft is an output shaft of an internal combustion engine (not shown) of the motor vehicle and the driven shaft is connected to an automatic transmission of the motor vehicle.

The hydrokinetic torque coupling device 10 includes a sealed casing 12 filled with a fluid, such as oil or transmission fluid. The sealed casing 12, a hydrodynamic torque converter 14 and a damper-piston assembly 16 are all rotatable about a rotational axis X. The drawings discussed herein show half-views, that is, the portion or fragment of the hydrokinetic torque coupling device 10 above rotational axis X. Generally, the torque coupling device 10 is symmetrical about the rotational axis X. Herein, the axial and radial orientations are considered with respect to the rotational axis X of the torque coupling device 10. The relative terms such as "axially," "radially," and "circumferentially" are with respect to orientations parallel to, perpendicular to, and circularly around the rotational axis X, respectively.

The sealed casing 12 according to the first exemplary embodiment as illustrated in FIG. 1 includes a first casing shell (or casing cover shell) 18 and a second casing shell 20 fixedly interconnected sealingly together, such as by welding at weld 19 at their outer peripheries, so as to be non-movable relative to one another. The first casing shell 18 is fixedly interconnected to the driving shaft, more typically a flywheel (not shown) that is fixed to and non-rotatable relative to the driving shaft, so that the casing 12 turns at the same speed that the engine operates for transmitting torque. Specifically, in the illustrated embodiment of FIG. 1 the casing 12 is rotatably driven by the internal combustion engine and is non-rotatably coupled to the flywheel thereof with studs 21, shown in FIG. 1. Each of the first and second casing shells 18, 20 may be, for example, formed integrally by press-forming one-piece metal sheets.

The first casing shell 18 includes a first sidewall portion 22 extending substantially radially relative to the direction from the rotational axis X (i.e., in a plane that is generally transverse to the rotational axis X) and a cylindrical first outer wall portion $26_1$ extending substantially axially from the first sidewall portion 22 toward the second casing shell 20. The first sidewall portion 22 includes a first engagement surface 23 extending substantially radially relative to the direction from the rotational axis X. The first engagement surface 23 may be a machined surface.

Similarly, the second casing shell 20 includes a second sidewall portion 24 slanting relative to the rotational axis X and a cylindrical second outer wall portion $26_2$ extending substantially axially from the second sidewall portion 24 toward the first casing shell 18. The first and second outer wall portions $26_1$, $26_2$ collectively establish an annular outer wall 26 substantially parallel to the rotational axis X. The weld connection 19 fixedly secures the outer wall portions $26_1$ and $26_2$ together. Although not shown, the casing 12 may include additional components, such as an annular cylindrical shell welded at opposite ends to and interconnecting the first and second outer wall portions $26_1$, $26_2$ together.

The torque converter 14 includes an impeller (sometimes referred to as the pump or impeller wheel) 30, a turbine 32, and a stator (sometimes referred to as the reactor) 34 interposed axially between the impeller 30 and the turbine 32. The impeller 30, the turbine 32, and the stator 34 are coaxially aligned with one another on the rotational axis X to collectively form a torus. The impeller 30 and the turbine 32 are constructed and arranged to fluidly/hydrodynamically couple to one another as known in the art.

The second casing shell 20 of the casing 12 also forms and serves as the impeller shell of the impeller 30. Accordingly, the impeller shell 20 sometimes is referred to as part of the casing 12. The impeller 30 further includes a core ring 45, and a plurality of impeller blades 33 fixedly attached, such as by brazing, to the impeller shell 20 and the core ring 45. The impeller 30, including the impeller shell 20, the core ring 45, and the impeller blades 33, is fixedly secured to so as to be non-rotatable relative to the second casing shell 20 and hence to the drive shaft (or flywheel) of the engine so that the impeller 30 rotates at the same speed as the engine output. The impeller 30 also includes an impeller hub 31 fixedly secured to the impeller shell 20. The impeller hub 31 is arranged for engagement with a hydraulic pump of the transmission.

The turbine 32 includes a turbine shell 35, a core ring 46, and a plurality of turbine blades 36 fixedly attached, such as by brazing, to the turbine shell 35 and the core ring 46. Suitable configurations for the impeller 30 and turbine 32 are known in the art.

The hydrokinetic torque coupling device 10 further includes a rotatable output hub 40 having a radially outward extending flange 48. The output hub 40 is operatively coupled to and coaxial with the driven shaft, such as a transmission input shaft. For example, the output hub 40 may be provided with internal splines 42 or grooves for non-rotatably coupling the output hub 40 to complementary external splines or grooves of the driven shaft. Alternatively, a weld or other connection may be used to fix the output hub 40 to the driven shaft. A radially outer surface of the output hub 40 includes an annular slot 43 for receiving a sealing member, such as an O-ring 44. Although not shown, another sealing member may be mounted to a radially inner surface of the output hub 40 to create a seal at the interface of the transmission input shaft and the output hub 40.

Rivets 49 connect the flange 48 of the output hub 40 to a radially inner end of the turbine shell 35 so that the turbine shell 35 and the output hub 40 are non-rotatable relative to one another, i.e., the turbine shell 35 and the output hub 40 rotate together about axis X at the same rotational speed. The spinning of the impeller 30 causes transmission fluid in a torus chamber 52 to spin the turbine blades 36, and hence the turbine shell 35 and the output hub 40 attached thereto by the rivets 49 when the device 10 operates in hydrodynamic mode.

A transmission member 56 is fixedly attached to the turbine shell 35, preferably directly attached, such as by an annular weld 55 and/or fasteners. The weld may comprise a continuous welding bead in order to avoid any leaks in this area. The transmission member 56 may be integrally formed with the turbine shell 35. The transmission member 56 includes driven tabs 58 extending axially towards the damper-piston assembly 16, which is described in greater detail below.

The stator 34 is positioned between the impeller 30 and the turbine 32 to redirect fluid from the turbine 32 back to the impeller 30 in an efficient manner. The stator 34 is typically mounted on a one-way clutch 72 to prevent the stator 34 from counter-rotation. The opposite sides of the stator 34 include a first bearing ring $73_1$ and a second bearing ring $73_2$, respectively. A first thrust bearing $74_1$ is interposed between the first bearing ring $73_1$ and the impeller shell 20 of the casing 12. A second thrust bearing $74_2$ is interposed between the second bearing ring $73_2$ and the output hub 40.

The damper-piston assembly 16 is housed in the casing 12 axially between the turbine shell 35 and the first casing shell 18. As best shown in FIG. 1, the damper-piston assembly 16 includes a piston retainer plate 60 and a plurality of torsional vibration damping members 62. The piston retainer plate 60 extends radially from a radially inner flanged first end 64 to a radially outer flange second end 66. The first end 64 is substantially cylindrical, and floats slightly on the output hub 40 so as to be rotatable and axially slidable relative to the output hub 40. The sealing member (e.g., O-ring) 44 creates a seal at the interface of the flanged first end 64 and the output hub 40. As discussed in further detail below, damper-piston assembly 16 is axially movably relative to the output hub 40 along this interface. The piston retainer plate 60 may be a single piece.

Figure 2:
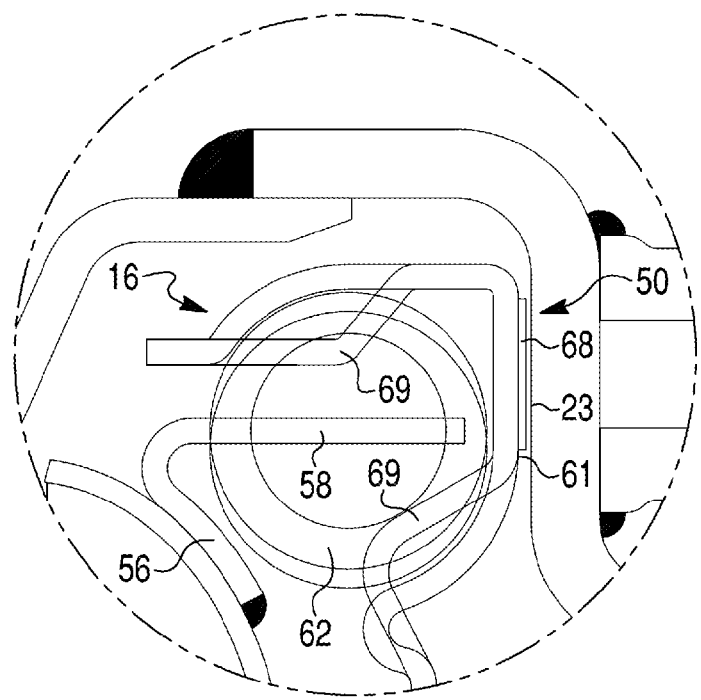
FIG. 2 is an enlarged fragmentary view of circle 2 of FIG. 1 showing the hydrokinetic torque coupling device in hydrodynamic transmission mode.
Figure 3:
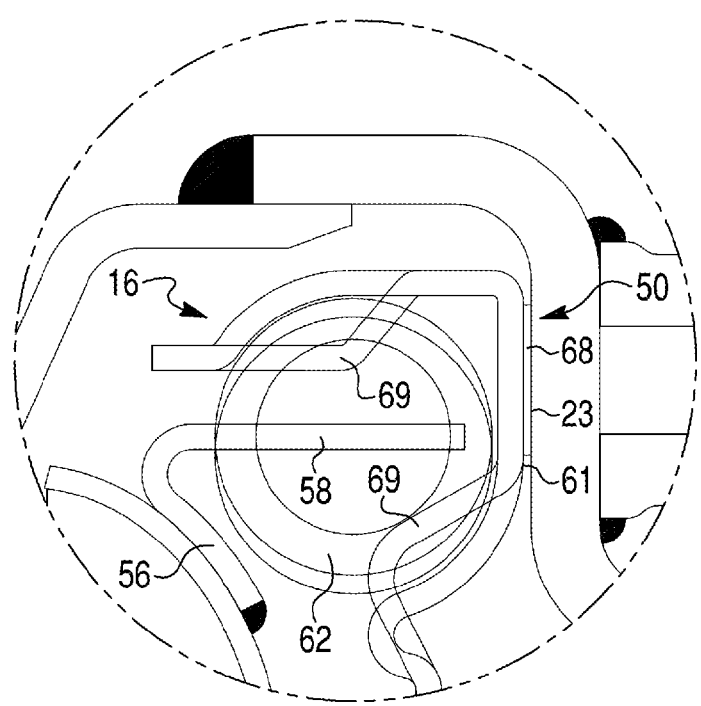
FIG. 3 is the same enlarged fragmentary view of circle 3 of FIG. 1, showing the hydrokinetic torque coupling device in lockup mode.

Proximate to the second end 66, the piston retainer plate 60 has a radially extending second engagement surface 61 (FIGS. 2 and 3) that faces the first engagement surface 23 of the first sidewall portion 22. A friction ring 68 (or friction lining) is secured to the second engagement surface 61, for example, by adhesive bonding and/or with fasteners. The friction ring 68 is made of a friction material for improved frictional performance. Alternatively, a friction ring 68 may be secured to the first engagement surface 23 of the casing 12. According to still another embodiment, a first friction ring is secured to the first engagement surface 23 of the casing 12 and a second friction ring is secured to the second engagement surface 61 of the piston retainer plate 60. It is within the scope of the invention to omit one or both of the friction rings.

The piston retainer plate 60 retains or holds the circumferential damping members 62 of the damper-piston assembly 16. The damping members 62 are circumferentially spaced from one another about the piston retainer plate 60. In the illustrated embodiment, the damping members 62 are partially radially outward of the impeller blades 33 and the turbine blades 36. Each of the damping members 62 has a first end and an opposite second end respectively spaced circumferentially from the second end and the first end of adjacent torsional vibration damping members on opposite sides/ends of the damping member 62. In this arrangement, the first end of each damping member 62 faces and is spaced from the second end of the adjacent damping member. According to the exemplary embodiment of FIG. 1 and other embodiments discussed herein, the damping members 62 are configured as helical (or coil) springs oriented substantially circumferentially about the rotational axis X. Other elastic members may be selected to replace or supplement the springs.

The piston retainer plate 60 includes driving tabs 69 circumferentially equidistantly spaced from one another to each directly engage the first end of a corresponding torsional vibration damping member 62. The driven tabs 58 of the transmission member 56 are likewise circumferentially equidistantly spaced from one another to each directly engage the second end of a corresponding torsional vibration damping member 62. The driving tabs 69 of the piston retainer plate 60 are rotatable relative to the driven tabs 58 of the transmission member 56 due to elasticity of the damping members 62, which absorb torsional vibration during operation of the device 10 in the lockup mode. As will become more apparent from the discussion below, the piston retainer plate 60 serves both as a clutch piston of a lockup clutch 50 and a retainer plate for the damper-piston assembly 16.

The piston retainer plate 60 is axially movable toward and away from the first casing shell 18 between a lockup position and a non-lockup (open) position. The torsional vibration damping members 62, which are received and retained by the piston retainer plate 60, axially displace with piston retainer plate 60. Axial movement of the piston retainer plate 60 is accomplished by changing the pressure differential on the opposite sides of the piston retainer plate 60. Referring to FIG. 1, a torus chamber 52 is to the left side of the turbine shell 35, and a first damper chamber 53 and a second damper chamber 54 are to the other (right) side of the turbine shell 35. The piston retainer plate 60 separates the first and second damper chambers 53, 54. In the illustrated embodiment of FIG. 1, the torus chamber 52 and the first damper chamber 53 remain in fluid communication with one another, irrespective of whether the lockup clutch 50 is in or out of lockup mode.

A pressure increase in the first damper chamber 53 (and the torus chamber 52) relative to the second damper chamber 54 (or stated differently a pressure decrease in the second damper chamber 54 relative to the first damper chamber 53) shifts the piston retainer plate 60 axially against the direction of torque transmission, i.e., towards the input side of the casing 12, that is left to right in FIG. 1, into lockup mode. In the lockup mode, the friction ring 68 of the second engagement surface 61 engages and is non-rotatably frictionally coupled to first engagement surface 23. The first engagement surface 23 may be machined to coordinate with the friction ring 68.

In lockup mode, torque is transferred from the engine to the first casing shell 18 of the casing 12, then by way of the frictional engagement between the first engagement surface 23 and the friction ring 68 of second engagement surface 61 of the piston retainer plate 60 on the output hub 40. Torque is transmitted from the driving tabs 69 of the piston retainer plate 60, through the torsional vibration damping members 62 that absorb torsional vibration, to the driven tabs 58 of the transmission member 56, through the transmission member to the turbine shell 35 affixed thereto, and then to the output hub 40 attached to the turbine shell 35 by rivets 49. Thereby, the lockup clutch 50 bypasses the hydrodynamic fluid coupling of the torque converter 14 and mechanically non-rotatably couples the driving and driven shafts.

The contact between the engagement surfaces 23 and 61 in the lockup mode creates a fluid seal, sealing the torus and first damper chambers 52, 53 from the second damper chamber 54. The friction ring 68 may have circumferentially spaced grooves (not shown) extending generally radially so as to fluidly connect the first damper chamber 53 and the second damper chamber 54 with one another in the lockup mode for cooling friction surfaces of the lockup clutch 50 with the working fluid.

On the other hand, a pressure decrease in the first damper chamber 53 (and the torus chamber 52) relative to the second damper chamber 54 (or stated differently a pressure increase in the second damper chamber 54 relative to the first damper chamber 53) shifts the piston retainer plate 60 axially in the direction of torque transmission, i.e., towards the output side of the casing 12, that is right to left in FIG. 1, out of lockup mode and into hydrodynamic transmission mode. In the non-lockup position, the piston retainer plate 60 is displaced axially away from the first sidewall portion 22 of the first casing shell 18 so that the second engagement surface 61 (or the friction ring 68 thereof) is spaced from and not non-rotatably frictionally coupled to the first engagement surface 23 of the casing 12. Thus, torque transferred from the engine to the casing 12 does not bypass the torque converter 14 through the lockup clutch 50 in the non-lockup mode. Instead, torque is transferred through operation of the torque converter 14. Notably, an open fluid passage is established between the engagement surface 23 of the casing 12 and the friction ring 68 of the second engagement surface 61 of the piston retainer plate 60. Hydraulic fluid is free to flow between the first damper chamber 53 and the second damper chamber 54 through the passage.

Pressure changes between chambers 53 and chamber 54 are created by control of the fluid, e.g., hydraulic fluid or oil, in the chambers 52, 53 and 54. Pressure control is known in the art.

As the damper-piston assembly 16 moves axially into and out of lockup position as described above, the driven tabs 58 of the transmission member 56 are axially displaced relative to the piston retainer plate 60 and the damping members 62. The relative axial movement between the driven tabs 58 and the damper-piston assembly 16 allows the turbine shell 35 to remain fixed axially on the output hub 40 by the rivets 49.

In operation, the lockup clutch 50 is generally activated after the hydrodynamic coupling of the driving and driven shafts, typically at relatively constant speeds, in order to avoid the loss of efficiency caused in particular by slip phenomena between the turbine 32 and the impeller 30. A biasing member, such as a spring, may be included in the hydrokinetic torque coupling device 10 to axially urge the piston retainer plate 60 into or out of lockup mode.

The piston retainer plate 60 both forms the piston component of the lockup clutch 50 and the retaining element of the damper-piston assembly 16. By consolidating components, which are normally separate from one another, into a single component, space is saved in the hydrokinetic torque coupling device 10. This space-saving structure provides several design options. For example, the hydrokinetic torque coupling device 10 can be made smaller and lighter. Alternatively, the free space within the casing 12 can be used to add additional components, such as damping components.

Various modifications, changes, and alterations may be practiced with the above-described embodiment. The features of the embodiments described herein may be practice with one another and are substitutable in numerous combinations. In the interest of brevity, reference characters that are discussed above in connection with FIG. 1 are not reproduced in or further elaborated upon below in FIGS. 4-6, except to the extent necessary or useful to explain the additional embodiments of FIG. 1. Modified components and parts are indicated by the addition of the suffix "A" for the first modification of FIG. 4, the suffix "B" for the second modification of FIG. 5, and the suffix "C" for the third modification of FIG. 6.

Figure 4:
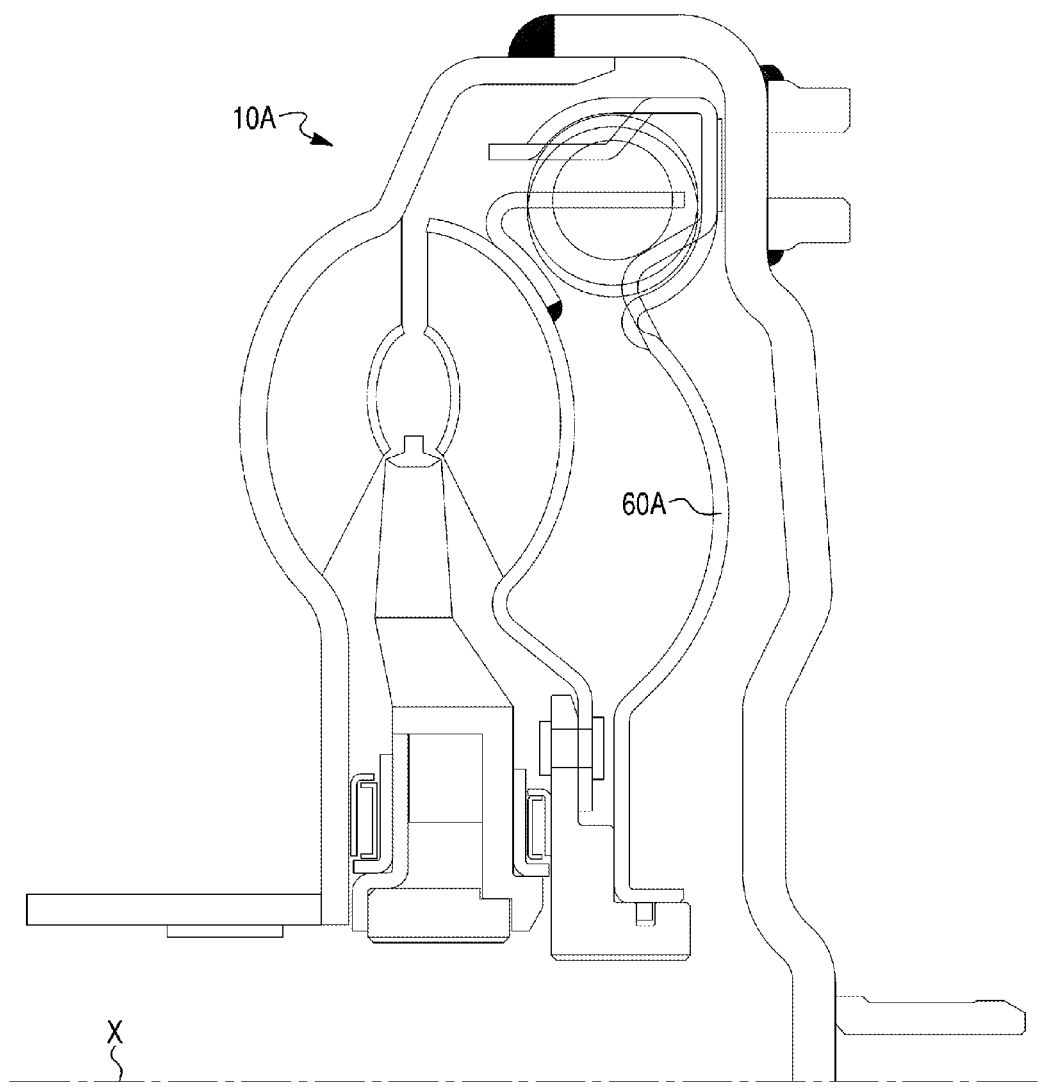
FIG. 4 is a fragmented half-view in axial section of the hydrokinetic torque coupling device of FIG. 1 modified to include an arcuate piston retainer plate.
Figure 5:
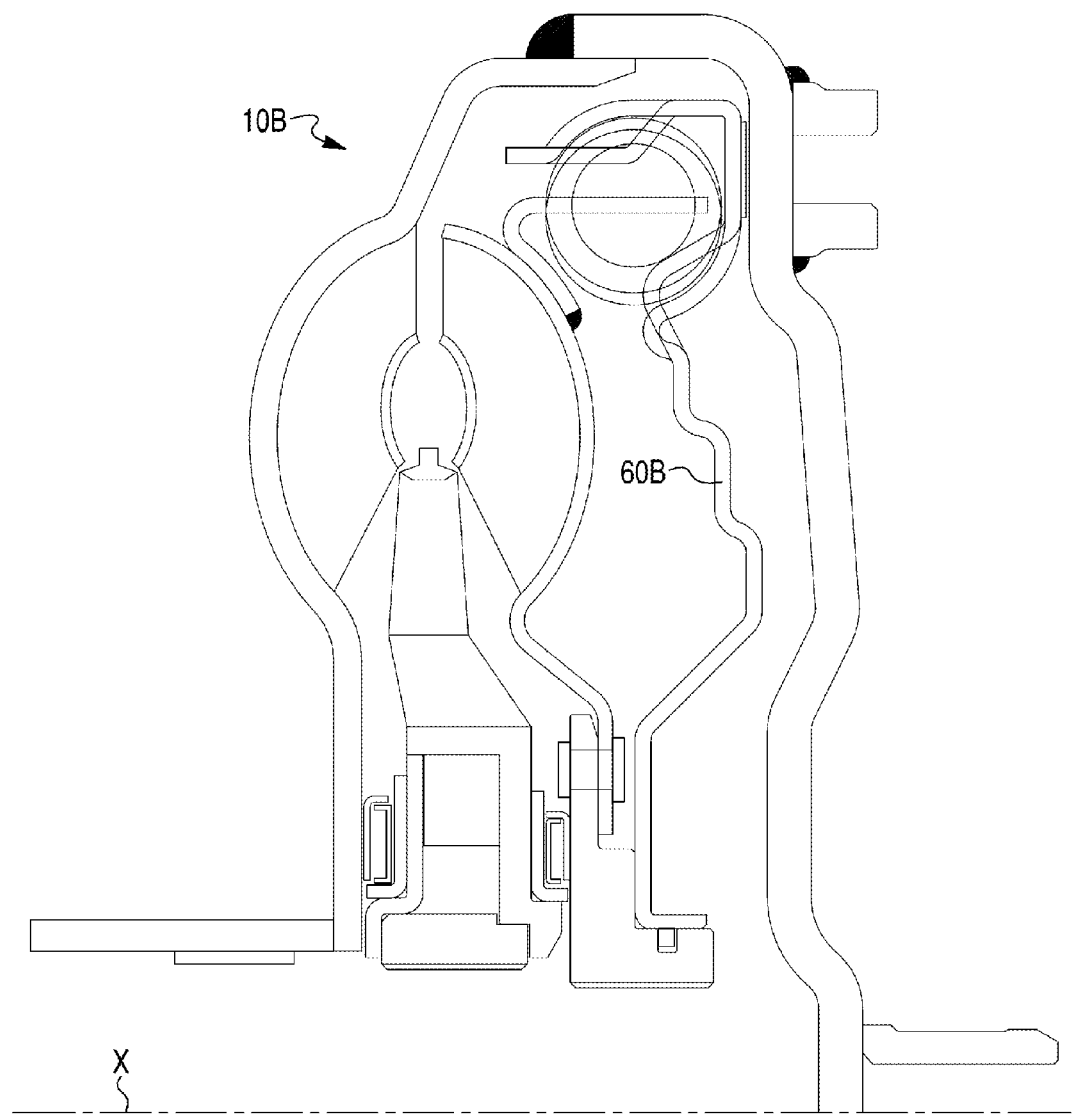
FIG. 5 is a fragmented half-view in axial section of the hydrokinetic torque coupling device of FIG. 1 modified to include a stepped piston retainer plate.
Figure 6:
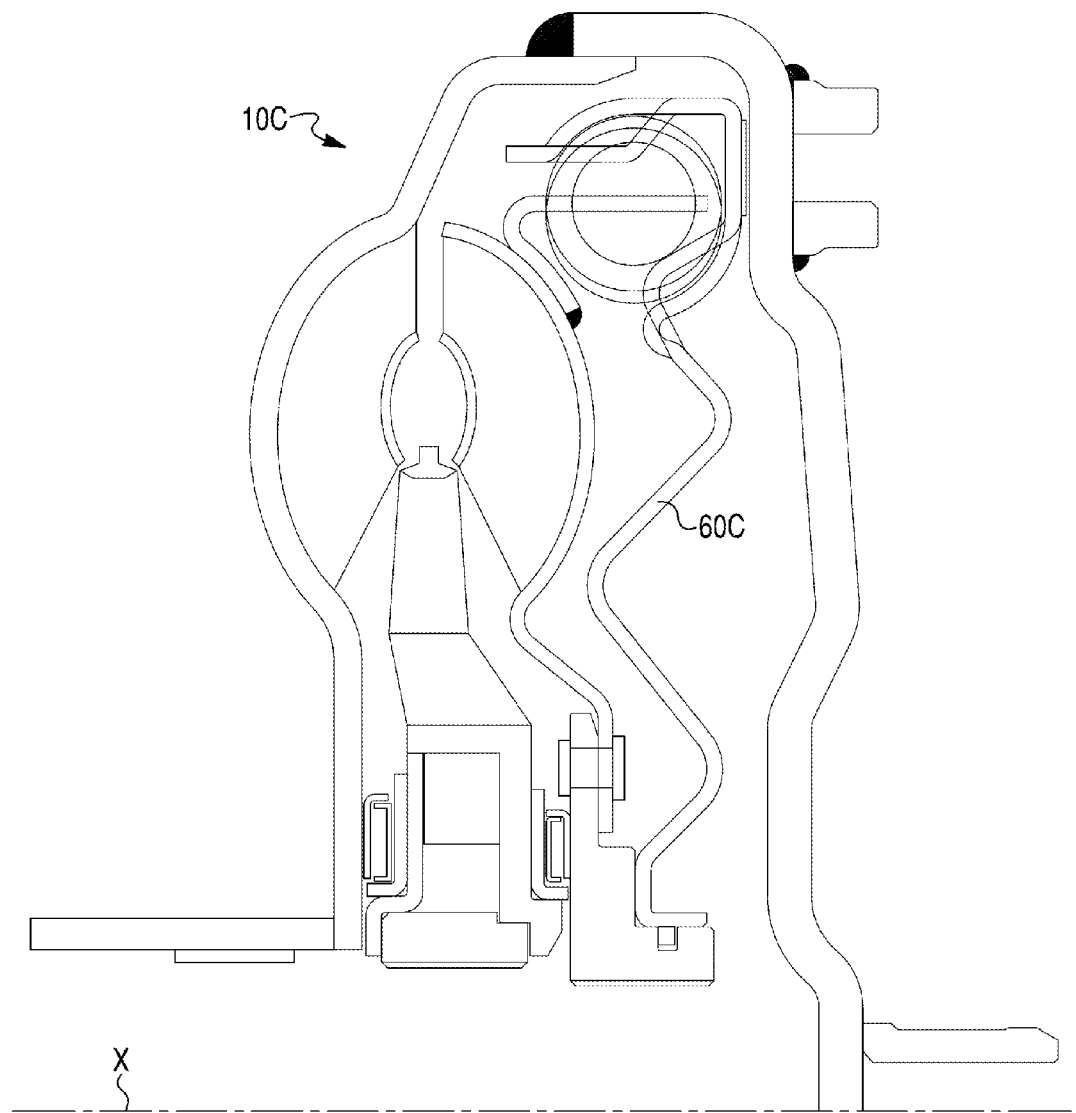
FIG. 6 is a fragmented half-view in axial section of the hydrokinetic torque coupling device of FIG. 1 modified to include a wave-like or serpentine piston retainer plate.

FIG. 4 shows a modified embodiment including an arcuate piston retainer plate 60A. The arcuate piston retainer plate 60A has a centrally located arcuate portion of constant radius to increase the stiffness and reduce axial deflection. The arcuate portion has a major convex surface facing away from the turbine shell and a major concave surface facing towards the turbine shell. FIG. 5 shows another modified embodiment including a stepped or stair-like piston retainer plate 60B. The piston retainer plate 60B has a stepped portion including a radially inner first end, a radially outer second end, and a plurality of steps that are progressively positioned in closer proximity axially to the turbine shell in a direction from the first end to the second end. The stepped or stair-like configuration of the piston retainer plate 60B increases stiffness and reduces axial deflection. FIG. 6 shows still another modified embodiment including a wave-like or serpentine piston retainer plate 60C. The piston retainer plate 60C includes a serpentine portion having a generally sinusoidal shape extending radially outward between a radially inner first end and a radially outer second end of the piston retainer plate. This modified configuration likewise provides the piston retainer plate 60C with increased stiffness and reduced axial deflection.

An exemplary method for assembling the hydrokinetic torque coupling device 10 according to the embodiment of FIGS. 1-6 will now be explained. It should be understood that this exemplary method is not the exclusive method for assembling the hydrokinetic torque coupling devices described herein. While the methods for assembling the hydrokinetic torque coupling devices may be practiced by sequentially performing the steps as set forth below, it should be understood that the methods may involve performing the steps in different sequences.

The impeller 30, the turbine 32, the stator 34, and the damper-piston assembly 16 may each be preassembled. The turbine 32 includes, as noted above, the turbine shell 35 and the turbine blades 36 attached to the turbine shell 35. The transmission member 56 may be, for example, stamped from metal. The impeller 30, the stator 34, and the turbine 32 subassemblies are assembled together. During assembly of the torque converter 42, the rivets or other fasteners 49 are applied to connect the output hub 40 to the turbine shell 35. It should be understood that a plurality of circumferentially spaced rivets/fasteners 49 may be used, although only one is shown in the cross-section of FIG. 1. The transmission member 56 is secured, such as by continuously welding at the weld 55, to the turbine shell 35. The cylindrical flange 64 of the piston retainer plate 60 is mounted to slidingly engage the output hub 40 (splined with the driven shaft at 42). The driven tabs 58 of the transmission member 56 are slidingly engaged with the damper-piston assembly 16 as described above as the damper-piston assembly 16 is fit on the output hub 40 with the sealing member 44 located in slot 43. Then, the first casing shell 18 is non-moveably and sealingly secured, such as by welding at 19, to the second casing shell 20, as best shown in FIG. 1.

Figure 8:
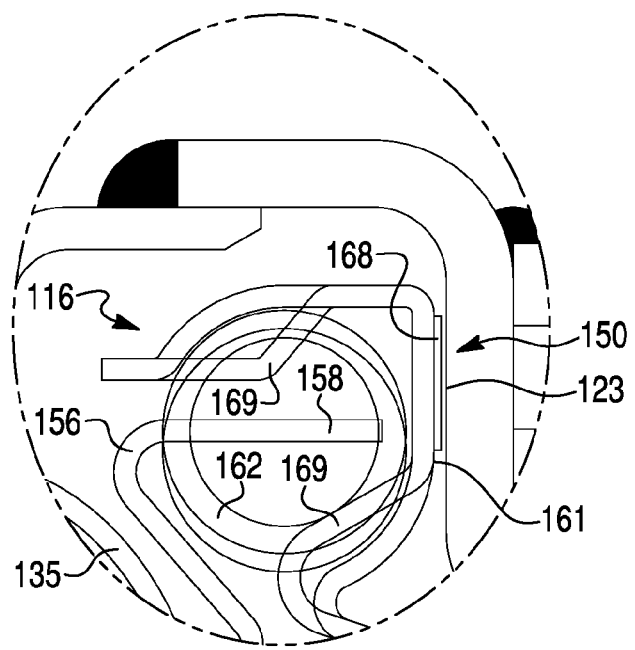
FIG. 8 is an enlarged fragmentary view of circle 8 of FIG. 7 showing the hydrokinetic torque coupling device in hydrodynamic transmission mode.
Figure 9:
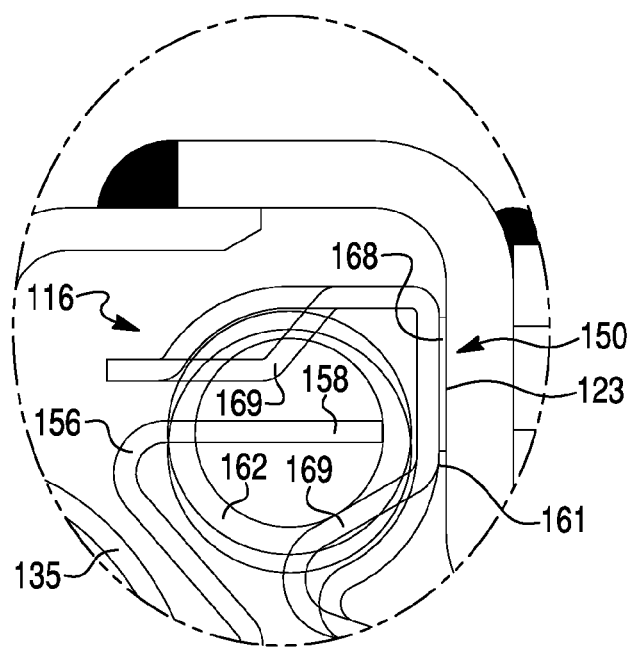
FIG. 9 is the same enlarged fragmentary view of circle 9 of FIG. 7, showing the hydrokinetic torque coupling device in lockup mode.

A second embodiment of the invention will now be described with reference to FIGS. 7-9.

Figure 7:
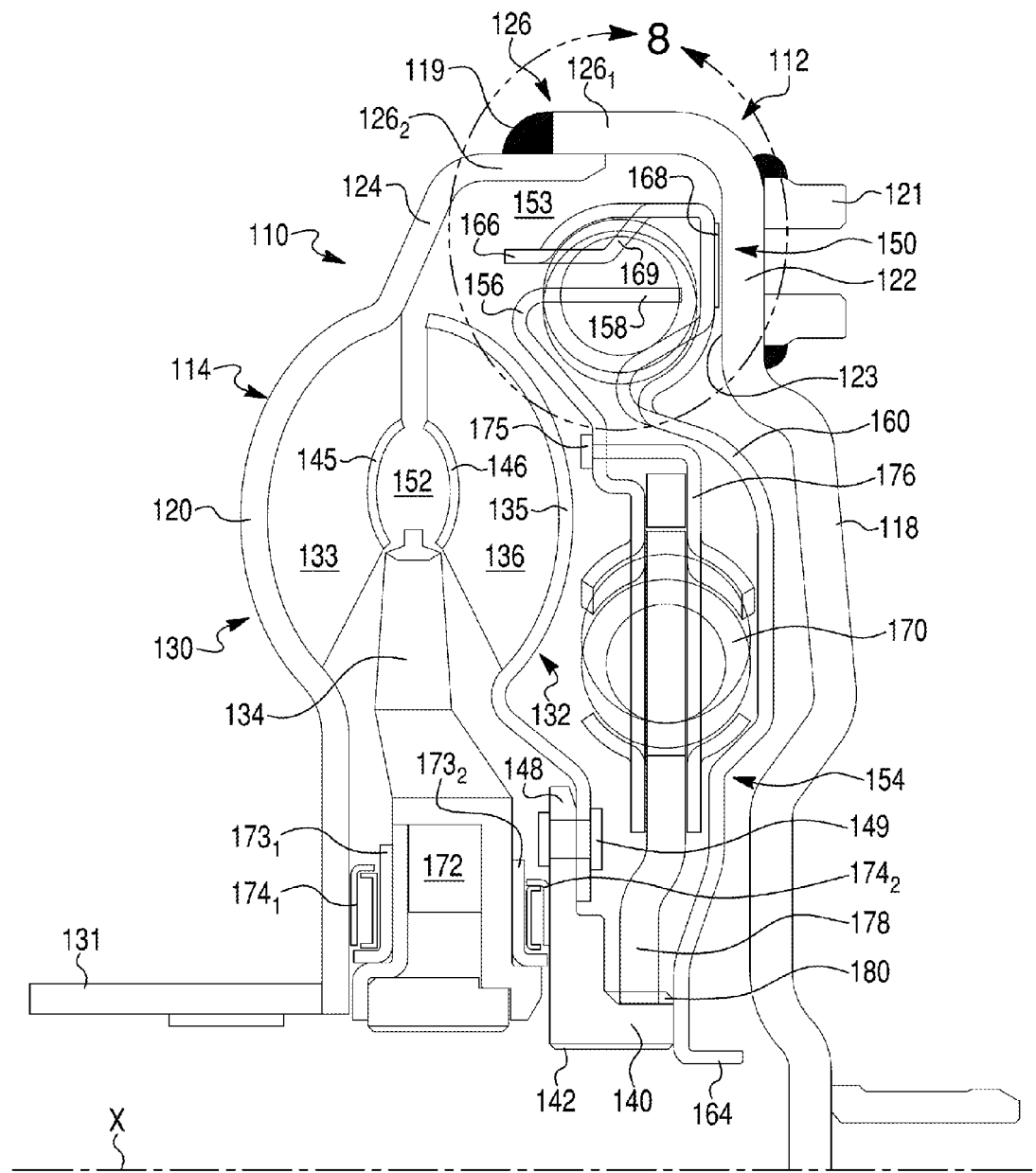
FIG. 7 is a fragmented half-view in axial cross section of a hydrokinetic torque coupling device in accordance with a second exemplary embodiment of the present invention.

A sealed casing 112 of a hydrokinetic torque coupling device 110 according to the second exemplary embodiment as illustrated in FIG. 7 includes a first casing shell (or casing cover shell) 118 and a second casing shell 120 fixedly interconnected sealingly together, such as by weld 119 at their outer peripheries, so as to be non-movable relative to one another. The first casing shell 118 is fixedly interconnected to the driving shaft, more typically a flywheel (not shown) that is fixed to and non-rotatable relative to the driving shaft, so that the casing 112 turns at the same speed that the engine operates for transmitting torque. Specifically, in the illustrated embodiment of FIG. 7 the casing 112 is rotatably driven by the internal combustion engine and is non-rotatably coupled to the flywheel thereof with studs 121. Each of the first and second casing shells 118, 120 may be, for example, formed integrally by press-forming one-piece metal sheets.

The first casing shell 118 includes a first sidewall portion 122 extending substantially radially relative to the direction from the rotational axis X (i.e., in a plane that is generally transverse to the rotational axis X) and a cylindrical first outer wall portion $126_1$ extending substantially axially from the first sidewall portion 122 toward the second casing shell 120. The first sidewall portion 122 includes a first engagement surface 123 extending substantially radially relative to the direction from the rotational axis X. The first engagement surface 123 may be machined.

Similarly, the second casing shell 120 includes a second sidewall portion 124 slanting relative to the rotational axis X and a cylindrical second outer wall portion $126_2$ extending substantially axially from the second sidewall portion 124 toward the first casing shell 118. The first and second outer wall portions $126_1$, $126_2$ collectively establish an annular outer wall 126 substantially parallel to the rotational axis X. The weld connection 119 fixedly secures the outer wall portions $126_1$ and $126_2$ together. Although not shown, the casing 112 may include additional components, such as an annular cylindrical shell welded at opposite ends to and interconnecting the first and second outer wall portions $126_1$, $126_2$ together.

A torque converter 114 includes an impeller (sometimes referred to as the pump or impeller wheel) 130, a turbine 132, and a stator (sometimes referred to as the reactor) 134 interposed axially between the impeller 130 and the turbine 132. The impeller 130, the turbine 132, and the stator 134 are coaxially aligned with one another on the rotational axis X to collectively form a torus. The impeller 130 and the turbine 132 are constructed and arranged to fluidly/hydrodynamically couple to one another as known in the art.

The second casing shell 120 of the casing 112 also forms and serves as the impeller shell of the impeller 130. Accordingly, the impeller shell 120 sometimes is referred to as part of the casing 112. The impeller 130 further includes a core ring 145, and a plurality of impeller blades 133 fixedly attached, such as by brazing, to the impeller shell 120 and the core ring 145. The core ring 145 and the impeller blades 133 are fixedly secured and non-rotatable relative to the second casing shell 120, and hence to the drive shaft (or flywheel) of the engine, so that the impeller 130 rotates at the same speed as the engine output. The impeller 130 also includes an impeller hub 131 fixedly secured to the impeller shell 120. The impeller hub 131 is arranged for engagement with a hydraulic pump of the transmission.

The turbine 132 includes a turbine shell 135, a core ring 146, and a plurality of turbine blades 136 fixedly attached, such as by brazing, to the turbine shell 135 and the core ring 146. Suitable configurations for the impeller 130 and turbine 132 are known in the art.

The hydrokinetic torque coupling device 110 further includes a rotatable output hub 140 having a radially outward extending flange 148, The output hub 140 is operatively coupled to and coaxial with the driven shaft, such as a transmission input shaft. For example, the output hub 140 may be provided with internal splines 142 or grooves for non-rotatably coupling the output hub 140 to complementary external splines or grooves of the driven shaft. Alternatively, a weld or other connection may be used to fix the output hub 140 to the driven shaft. A radially outer surface of the output hub 140 includes splines 180, which will be discussed in further detail below. Although not shown, a sealing member may be mounted to a radially inner surface of the output hub 140 to create a seal at the interface of the transmission input shaft and the output hub 140.

Rivets 149 connect the flange 148 of the output hub 140 to a radially inner end of the turbine shell 135 so that the turbine shell 135 and the output hub 140 are non-rotatable relative to one another, i.e., the turbine shell 135 and the output hub 140 rotate together about axis X at the same rotational speed. The spinning of the impeller 130 causes transmission fluid in a torus chamber 152 to spin the turbine blades 136, and hence the turbine shell 135 and the output hub 140 attached thereto by the rivets 149 when the device 110 operates in hydrodynamic mode.

The stator 134 is positioned between the impeller 130 and the turbine 132 to redirect fluid from the turbine 132 back to the impeller 130 in an efficient manner. The stator 134 is typically mounted on a one-way clutch 172 to prevent the stator 134 from counter-rotation. The opposite sides of the stator 134 include a first bearing ring $173_1$ and a second bearing ring $173_2$, respectively. A first thrust bearing $174_1$ is interposed between the first bearing ring $173_1$ and the impeller shell 120 of the casing 112. A second thrust bearing $174_2$ is interposed between the second bearing ring $173_2$ and the output hub 140.

The damper-piston assembly 116 is housed in the casing 112 axially between the turbine shell 135 and the first casing shell 118. As best shown in FIG. 7, the damper-piston assembly 116 includes a piston retainer plate 160, a (radially outer) first set of first torsional vibration damping members 162 circumferentially spaced from one another, a (radially inner) second set of second torsional vibration damping members 170 circumferentially spaced from one another, a transmission component 156 drivenly coupled to the piston retainer plate 160 through the first torsional vibration damping members 162, and a driven (or output) member 178 connected to the output hub 140 and drivenly coupled on its input side to the transmission component 156 through the second torsional vibration damping members 170.

The first torsional vibration damping members 162 are radially outward of the second torsional vibration damping members 170. According to the exemplary embodiment of FIG. 7, the first and second torsional vibration damping members 162, 170 are configured as helical (or coil) springs having principal axes oriented substantially circumferentially. Other elastic members may be selected to replace or supplement the springs. The first torsional vibration damping members 162 each have opposite first and second ends, wherein the first and second ends of any first torsional vibration damping member 162 are circumferentially spaced from second and first ends, respectively, of adjacent first torsional vibration damping members 162. Similarly, the second torsional vibration damping members 170 each have opposite third and fourth ends, wherein the third end of any second torsional vibration damping member 170 is circumferentially spaced from the fourth end of an adjacent second torsional vibration damping member 170. In the illustrated embodiment, the first torsional vibration damping members 162 are partially radially outward of the impeller blades 133 and the turbine blades 136.

The piston retainer plate 160 extends radially from a radially inner flanged first end 164 to a radially outer flange second end 166. The first end 164 is configured as a cylindrical flange, which "floats" slightly on the transmission input shaft so as to be rotatable and axially slidable relative to the transmission input shaft. A seal may be established at the interface of the first end 164 and the transmission input shaft. At the opposite radially outer second end 166, the piston retainer plate 160 includes driving tabs 169 circumferentially equidistantly spaced from one another to each directly engage the first end of a corresponding first torsional vibration damping member 162. The piston retainer plate 160 may be a single piece.

The piston retainer plate 160 has a radially extending second engagement surface 161 (FIGS. 8 and 9) that faces the first engagement surface 123 of the first sidewall portion 122. A friction ring (or friction lining) 168 is secured to the second engagement surface 161, for example, by adhesive bonding and/or with fasteners. The friction ring 168 is made of a frictional material for improved frictional performance. Alternatively, a friction ring 168 may be secured to the first engagement surface 123 of the casing 112. According to still another embodiment, a first friction ring is secured to the first engagement surface 123 of the casing 112 and a second friction ring or liner is secured to the second engagement surface 161 of the piston retainer plate 160. It is within the scope of the invention to omit one or both of the friction rings.

The transmission member 156 serves as an intermediate member or plate connecting the first torsional vibration damping members 162 to the second torsional vibration damping members 170. Axially extending driven tabs 158 at the radially outer end of the transmission member 156 are circumferentially equidistantly spaced from one another. Each driven tab 158 directly engages a second end of a corresponding first torsional vibration damping member 162. The driving tabs 169 of the piston retainer plate 160 are rotatable relative to the driven tabs 158 of the transmission member 156 due to elasticity of the first damping members 162, which absorb torsional vibration during operation of the device 110 in the lockup mode. As will become more apparent from the discussion below, the piston retainer plate 160 serves both as a clutch piston for the lockup clutch 150 and a retainer plate for the first torsional vibration damping members 162 of the damper-piston assembly 16.

Rivets 175 or other fasteners fixedly connect the transmission member 156 to a disk member 176. A disk-part of the transmission member 156 and the disk member 176 serve as input parts for the second torsional vibration damping members 170 having third and fourth ends. Driving tabs of the transmission member 156 and the disk member 176 are circumferentially equidistantly spaced from one another. Each driving tab directly engages a third end of a corresponding second torsional vibration damping member 170.

The driven member 178 has tabs directly engaging the fourth ends of the second torsional vibration damping members 170. The driving tabs of the transmission member 156 and the disk member 176 are rotatable relative to the driven member 178 due to elasticity of the second damping members 170, which absorb torsional vibration during operation of the device 110 in the lockup mode.

Although the above embodiments are described as including tabs for engaging the opposite ends of the torsional vibration damping members 162, 170, it should be understood that equivalent and other structures, such as "windows," may be used.

Relative axial displacement of the damper-piston assembly 116 during movement of the damper-piston assembly 116 between lockup and non-lockup modes is accomplished by providing splines 180 which establish a slidable connection between the driven member 178 and the output hub 140.

The piston retainer plate 160 is axially movable toward and away from the first casing shell 118 between the lockup position and the non-lockup (open) position. The first torsional vibration damping members 162, which are received and retained by the piston retainer plate 160, and the second torsional vibration damping members 170 axially displace with piston retainer plate 160. Axial movement of the piston retainer plate 160 (and the remainder of the damper-piston assembly 116) is accomplished by changing the pressure differential on the opposite sides of the piston retainer plate 160. Referring to FIG. 7, a torus chamber 152 is to the left side of the turbine shell 135, and a first damper chamber 153 and a second damper chamber 154 are to the other (right) side of the turbine shell 135. The piston retainer plate 160 separates the first and second damper chambers 153, 154 from one another. In the illustrated embodiment of FIG. 7, the torus chamber 152 and the first damper chamber 153 remain in fluid communication with one another, irrespective of whether the lockup clutch 150 is in or out of lockup mode.

A pressure increase in the first damper chamber 153 (and the torus chamber 152) relative to the second damper chamber 154 (or stated differently a pressure decrease in the second damper chamber 154 relative to the first damper chamber 153) shifts the piston retainer plate 160 axially against the direction of torque transmission, i.e., towards the input side of the casing 112, that is left to right in FIG. 7, into lockup mode. In the lockup mode, the friction ring 168 of the second engagement surface 161 engages and is non-rotatably frictionally coupled to first engagement surface 123, as best shown in FIG. 9. The first engagement surface 123 may be machined to coordinate with the friction ring 168.

In lockup mode, torque is transferred from the engine to the first casing shell 118 of the casing 112, then by way of the frictional engagement between the first engagement surface 123 and the frictional lining 168 of second engagement surface 161 of the piston retainer plate 160. Torque is transmitted from the driving tabs 169 of the piston retainer plate 160, through the first torsional vibration damping members 162 that absorb torsional vibration relative to the driven tabs 158 of the transmission member 156, through the transmission member 156 to the second torsional vibration damping members 170 that further absorb torsional vibration, then to the driven member 178 and the output hub 140. Thereby, the lockup clutch 150 bypasses the hydrodynamic fluid coupling of the torque converter 114 and mechanically non-rotatably couples the driving and driven shafts.

The contact between the engagement surfaces 123 and 161 in the lockup mode creates a fluid seal, sealing the torus and first damper chambers 152, 153 from the second damper chamber 154. The friction ring 168 may have circumferentially spaced grooves (not shown) extending generally radially so as to fluidly connect the first damper chamber 153 and the second damper chamber 154 with one another in the lockup mode for cooling friction surfaces of the lockup clutch 150 with the working fluid.

On the other hand, a pressure decrease in the first damper chamber 153 (and the torus chamber 152) relative to the second damper chamber 154 (or stated differently a pressure increase in the second damper chamber 154 relative to the first damper chamber 153) shifts the piston retainer plate 160 axially in the direction of torque transmission, i.e., towards the output side of the casing 112, that is right to left in FIG. 7, out of lockup mode and into the hydrodynamic transmission mode. As best shown in FIG. 8, in the non-lockup position, the piston retainer plate 160 is displaced axially away from the first sidewall portion 122 of the first casing shell 118 so that the second engagement surface 161 (or the friction ring 168 thereof) is spaced from and not non-rotatably frictionally coupled to the first engagement surface 123 of the casing 112. Thus, torque transferred from the engine to the casing 112 does not bypass the torque converter 114 through the lockup clutch 150 in the non-lockup mode. Notably, an open fluid passage is established between the engagement surface 123 of the casing 112 and the friction ring 168 of the second engagement surface 161 of the piston retainer plate 160. Hydraulic fluid is free to flow between the first damper chamber 153 and the second damper chamber 154 through the passage.

Pressure changes between chambers 153 and chamber 154 are created by control of the fluid, e.g., hydraulic fluid or oil, in the chambers 152, 153 and 154. Pressure control is known in the art.

In operation, the lockup clutch 150 is generally activated after the hydrodynamic coupling of the driving and driven shafts, typically at relatively constant speeds, in order to avoid the loss of efficiency caused in particular by slip phenomena between the turbine 132 and the impeller 130. A biasing member, such as a spring, may be included in the hydrokinetic torque coupling device 110 to axially urge the piston retainer plate 160 into or out of lockup mode.

The piston retainer plate 160 both forms the piston component of the lockup clutch 150 and the retaining element of the damper-piston assembly 116. By consolidating those components, which are normally separate from one another, into a single piece, space is saved in the hydrokinetic torque coupling device 110. This space-saving structure provides several design options. For example, the hydrokinetic torque coupling device 110 can be made smaller and lighter. Alternatively, the free space within the casing 112 can be used to add additional components, such as damping components.

An exemplary method for assembling the hydrokinetic torque coupling device 110 according to the embodiment of FIGS. 7-9 will now be explained. It should be understood that this exemplary method is not the exclusive method for assembling the hydrokinetic torque coupling devices described herein. While the methods for assembling the hydrokinetic torque coupling devices may be practiced by sequentially performing the steps as set forth below, it should be understood that the methods may involve performing the steps in different sequences.

The impeller 130, the turbine 132, the stator 134, and the damper-piston assembly 116 may each be preassembled. The turbine 132 includes, as noted above, the turbine shell 135 and the turbine blades 136 attached to the turbine shell 135. The transmission member 156 may be, for example, stamped from metal. The impeller 130, the stator 134, and the turbine 132 subassemblies are assembled together. Rivets or other fasteners 149 are applied to connect the output hub 140 to the turbine shell 135. It should be understood that a plurality of circumferentially spaced rivets/fasteners 149 may be used, although only one is shown in the cross-section of FIG. 7. The transmission member 156 is secured, such as by continuously welding at the weld 155, to the turbine shell 135. The cylindrical flange 164 of the piston retainer plate 160 is mounted to slidingly engage the transmission input shaft, and the driven member 178 is splined with the output hub 140 at splines 180. Then, the first casing shell 118 is non-moveably and sealingly secured, such as by welding at 119, to the second casing shell 120, as best shown in FIG. 7.

Figure 10:
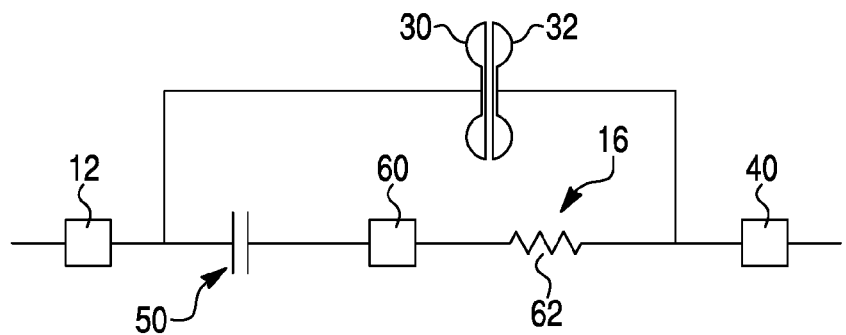
FIG. 10 is a simplified diagram of a hydrodynamic torque coupling device including a single damper assembly.
Figure 11:
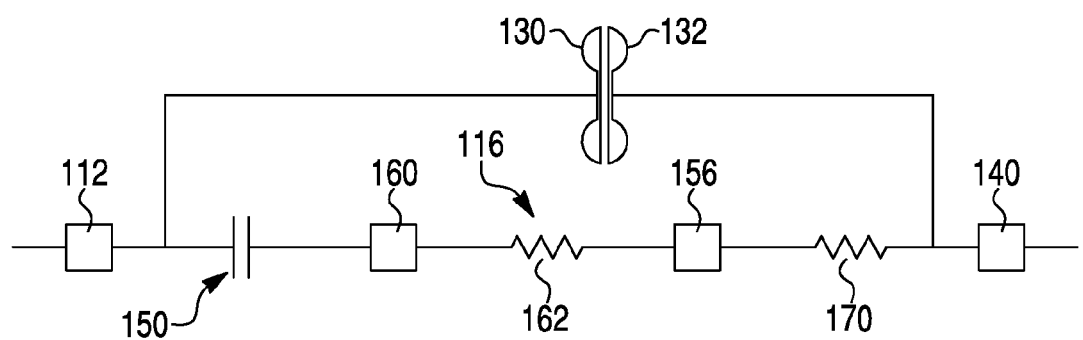
FIG. 11 is a simplified diagram of a hydrodynamic torque coupling device including dual or double damper assemblies.

FIG. 10 shows the damper assembly 16 of FIGS. 1-6, including one set of circumferentially extending elastic damping members 62. FIG. 11 shows the damper assembly 116 of FIGS. 7-9, including two sets of circumferentially extending elastic damping members 162, 170 and the transmission member 156 located between the damping members 162, 170.

Figure 12:
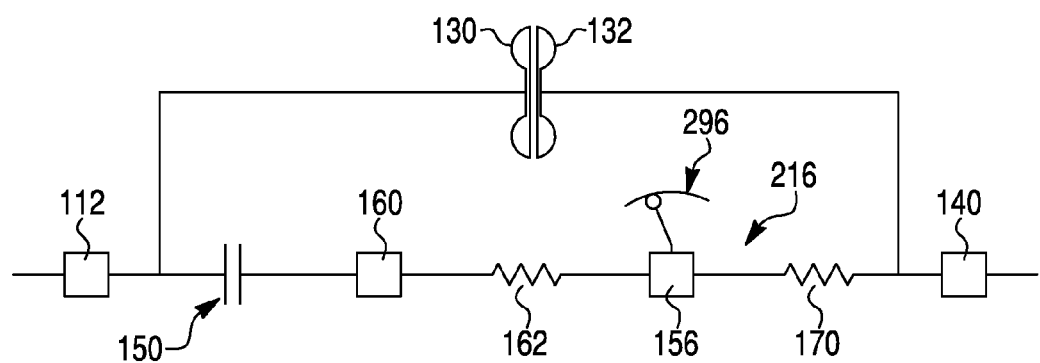
FIG. 12 is a simplified diagram of still another hydrodynamic torque coupling device including dual or double damper assemblies and a pendulum vibration absorber.

The hydrodynamic torque coupling devices described herein may incorporate additional damping components. For example, a damper assembly 216 shown in FIG. 12 is similar to that of FIG. 11, but further includes a centrifugal pendulum oscillator 296 coupled to the transmission member 156. Centrifugal pendulum oscillators (or pendulum vibration absorbers) are well known in the art and described in, for example, U.S. patent application Ser. No. 14/305,128 filed Jun. 16, 2014, GB598811 to Stone, U.S. Pat. No. 6,026,940 to Sudau, and EP1744074 to Grahl. The transmission member 156 may be modified to couple the centrifugal pendulum oscillator 296 to the circumference of the transmission member 156. Further, the centrifugal pendulum oscillators may be arranged on both sides of the transmission member 156.

Figure 13:
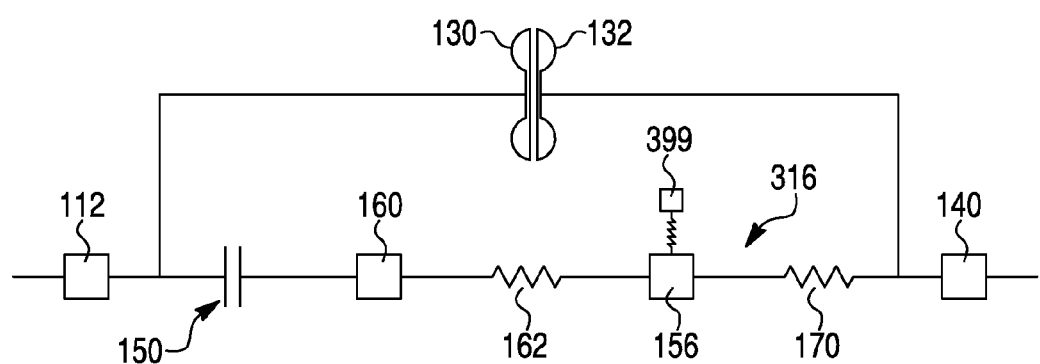
FIG. 13 is a simplified diagram of a further hydrodynamic torque coupling device including dual or double damper assemblies and a vibration absorbing spring-mass system.

A damper assembly 316 shown in FIG. 13 is similar to that of FIG. 11, but further includes a spring mass system 399 coupled to the transmission member 156. Spring-mass systems are well known in the art and described in, for example, WO 2004/018897 to Haller. The shape of the transmission member 156 may be modified to couple the spring-mass system 399 to the circumference of the transmission member 156. The springs of the spring-mass system 399 may be a coil spring, such as a steel spring. The damper may be any linear or non-linear damper, including for example a viscous damper. The spring and mass may be embodied as two components or one integral component. The spring-mass system 399 may have a linear or non-linear constant or variable stiffness, and a constant or variable mass.

The features of the above-described embodiments are substitutable in numerous combinations.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A hydrokinetic torque coupling device for coupling together a driving shaft and a driven shaft, the torque coupling device comprising:
    a casing shell rotatable about a rotational axis and having a first engagement surface;
    a torque converter rotatable about the rotational axis and comprising an impeller and a turbine, the turbine being hydrodynamically drivable by the impeller and comprising a turbine shell;
    an output hub;
    a damper-piston assembly comprising torsional vibration damping members and a piston retainer plate having a second engagement surface facing the first engagement surface, the torsional vibration damping members being circumferentially spaced from one another and having opposite first and second ends, the piston retainer plate comprising a shell portion retaining the torsional vibration damping members, first angular driving tabs engaging radially inner halves of the first ends of the torsional vibration damping members, and second angular driving tabs engaging radially outer halves of the first ends of the torsional vibration damping members; and
    a transmission component through which the torsional vibration damping members are interconnected to the output hub, the transmission component engaging the second ends of the torsional vibration damping members,
    wherein the damper-piston assembly is axially displaceable relative to the casing shell between a lockup mode in which the first and second engagement surfaces are frictionally engaged with one another so that the piston retainer plate and the casing shell are non-rotatable relative to one another, and a hydrodynamic transmission mode in which the first and second engagement surfaces are spaced from and rotatable relative to one another.

2. The hydrokinetic torque coupling device of claim 1, wherein the first and second angular driving tabs each comprise elbows having opposite ends merging with the shell portion of the piston retainer plate.

3. The hydrokinetic torque coupling device of claim 1, wherein the first engagement surface or the second engagement surface comprises a frictional lining.

4. The hydrokinetic torque coupling device of claim 1, further comprising a stator situated between the impeller and the turbine.

5. A hydrokinetic torque coupling device for coupling together a driving shaft and a driven shaft, the torque coupling device comprising:
    a casing shell rotatable about a rotational axis and having a first engagement surface;

a torque converter rotatable about the rotational axis and comprising an impeller and a turbine, the turbine being hydrodynamically drivable by the impeller and comprising a turbine shell;

an output hub that is non-rotatable relative to the turbine shell;

a damper-piston assembly comprising torsional vibration damping members and a piston retainer plate having a second engagement surface facing the first engagement surface, the torsional vibration damping members being circumferentially spaced from one another and having opposite first and second ends, the piston retainer plate comprising a shell portion retaining the torsional vibration damping members, first angular driving tabs engaging radially inner halves of the first ends of the torsional vibration damping members, and second angular driving tabs engaging radially outer halves of the first ends of the torsional vibration damping members; and a transmission component through which the torsional vibration damping members are interconnected to the output hub, the transmission component having a first end portion engaging the second ends of the torsional vibration damping members and a second end portion connected to and non-rotatable relative to the turbine shell, wherein the damper-piston assembly is axially displaceable relative to the casing shell between a lockup mode in which the first and second engagement surfaces are frictionally engaged with one another so that the piston retainer plate and the casing shell are non-rotatable relative to one another, and a hydrodynamic transmission mode in which the first and second engagement surfaces are spaced from and rotatable relative to one another.

6. The hydrokinetic torque coupling device of claim 5, wherein the first and second angular driving tabs each comprise elbows having opposite ends merging with the shell portion of the piston retainer plate.

7. The hydrokinetic torque coupling device of claim 5, wherein the first engagement surface or the second engagement surface comprises a frictional lining.

8. The hydrokinetic torque coupling device of claim 5, further comprising a stator situated between the impeller and the turbine.

9. The hydrokinetic torque, coupling device of claim 5, wherein the piston retainer plate is mounted and axially slidable on the output hub.

10. The hydrokinetic torque coupling device of claim 5, wherein the transmission component is directly connected to and non-rotatable relative to the turbine shell.

11. The hydrokinetic torque coupling device of claim 10, further comprising an annular weld directly connecting the transmission component to the turbine shell.

12. The hydrokinetic torque coupling device of claim 5, wherein the piston retainer plate has an arcuate portion extending generally radially outward, the arcuate portion having a major convex surface facing away from the turbine shell and a major concave surface facing towards the turbine shell.

13. The hydrokinetic torque coupling device of claim 5, wherein the piston retainer plate has a stepped portion comprising a radially inner first end, a radially outer second end, and a plurality of steps that are progressively positioned in closer proximity axially to the turbine shell in a direction from the first end to the second end.

14. The hydrokinetic torque coupling device of claim 5, wherein to piston retainer plate comprises a serpentine portion having a generally sinusoidal shape extending radially outward between a radially inner first end and a radially outer second end of the piston retainer plate.

15. A hydrokinetic torque coupling device for coupling together a driving shaft and a driven shaft, the torque coupling device comprising:

a casing shell rotatable about a rotational axis and having a first engagement surface;

a torque converter rotatable about the rotational axis and comprising an impeller and a turbine, the turbine being hydrodynamically drivable by the impeller and comprising a turbine shell;

an output hub;

a damper-piston assembly comprising a first set of first torsional vibration members circumferentially spaced from one another, the first torsional vibration members each having opposite first and second ends;

a second set of second torsional vibration members circumferentially spaced from one another, the second torsional vibration members each having opposite third and fourth ends;

a piston retainer plate having a second engagement surface facing the first engagement surface, the piston retainer plate comprising a shell portion retaining the first torsional vibration damping members, first angular driving tabs engaging radially inner halves of engaging the first ends of the first torsional vibration damping members, and second angular driving tabs engaging radially outer halves of the first ends of the first torsional vibration damping members;

a transmission component through which the first torsional vibration damping members are interconnected to the output hub, the transmission component having a first end portion engaging the second ends of the first torsional vibration damping members and a second end portion engaging the third ends of the second torsional vibration damping members; and an output member interconnecting the fourth ends of the second torsional vibration members to the output hub, wherein the damper-piston assembly is axially displaceable relative to the casing shell between a lockup mode in which the first and second engagement surfaces are frictionally engaged with one another so that the piston retainer plate and the casing shell are non-rotatable relative to one another, and a hydrodynamic transmission mode in which the first and second engagement surfaces are spaced from and rotatable relative to one another.

16. The hydrokinetic torque coupling, device of claim 15, wherein the first and second angular driving tabs each comprise elbows having opposite ends merging with the shell portion of the piston retainer plate.

17. The hydrokinetic torque coupling device of claim 15, wherein the first engagement surface or the second engagement surface comprises a frictional lining.

18. The hydrokinetic torque coupling device of claim 15, further comprising a stator situated between the impeller and the turbine.

19. The hydrokinetic torque coupling device of claim 15, further comprising a centrifugal pendulum oscillator coupled to the transmission component.

20. The hydrokinetic torque coupling device of claim 15, further comprising a spring mass system coupled to the transmission component.

\* \* \* \* \*